US010791285B2

(12) United States Patent
Choi (10) Patent No.: US 10,791,285 B2
(45) Date of Patent: *Sep. 29, 2020

(54) VIRTUAL FLYING CAMERA SYSTEM

(71) Applicant: Woncheol Choi, San Jose, CA (US)

(72) Inventor: Woncheol Choi, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,053

(22) Filed: Jul. 27, 2018

(65) Prior Publication Data

US 2018/0359427 A1 Dec. 13, 2018

Related U.S. Application Data

(63) Continuation-in-part of application No. 14/875,330, filed on Oct. 5, 2015, now Pat. No. 10,063,790.

(51) Int. Cl.

| H04N 5/265 | (2006.01) |
|---|---|
| H04N 5/247 | (2006.01) |
| G06T 7/579 | (2017.01) |
| G06T 7/292 | (2017.01) |
| H04N 5/268 | (2006.01) |
| H04N 7/01 | (2006.01) |
| H04N 21/4223 | (2011.01) |
| H04N 21/44 | (2011.01) |
| H04N 5/262 | (2006.01) |
| H04N 21/234 | (2011.01) |

(Continued)

(52) U.S. Cl.
CPC ............... *H04N 5/265* (2013.01); *G01S 3/00* (2013.01); *G06T 7/292* (2017.01); *G06T 7/579* (2017.01); *H04N 5/2224* (2013.01); *H04N 5/247* (2013.01); *H04N 5/268* (2013.01); *H04N 5/2628* (2013.01); *H04N 7/0127* (2013.01); *H04N 21/21805* (2013.01); *H04N 21/2387* (2013.01); *H04N 21/23424* (2013.01); *H04N 21/4223* (2013.01); *H04N 21/44* (2013.01); *H04N 21/6377* (2013.01); *G06T 2207/10016* (2013.01)

(58) Field of Classification Search
None
See application file for complete search history.

(56) References Cited

U.S. PATENT DOCUMENTS 5,745,126 A * 4/1998 Jain ...................... H04N 13/139
382/154
5,850,352 A * 12/1998 Moezzi ................ H04N 13/139
345/419

(Continued)

*Primary Examiner* — Kate H Luo (57) ABSTRACT

A virtual flying camera system is disclosed. According to one embodiment, a system includes: a video buffer configured to store input video streams from a plurality of cameras; and a video processor configured to generate an output video stream from the input video streams. The input video streams include a plurality of input video frames, each of the plurality of input video frames includes at least a partial image of a moving target. The output video stream includes a plurality of output video frames, each of the plurality of output video frames is generated by shifting a corresponding input video stream to position the moving target at a desired location within the output video frame, The output video stream is playable at a user-adjustable speed showing a view of a virtually flying camera that follows the moving target at the desired location within each of the plurality of output video frames.

16 Claims, 6 Drawing Sheets

(51) Int. Cl.
*H04N 21/6377* (2011.01)
*H04N 21/2387* (2011.01)
*H04N 21/218* (2011.01)
*H04N 5/222* (2006.01)
*G01S 3/00* (2006.01)

(56) References Cited

U.S. PATENT DOCUMENTS

| | | | |
|---|---|---|---|
| 7,577,199 B1* | 8/2009 | Herz | G08B 13/19608 348/143 |
| 2002/0122113 A1* | 9/2002 | Foote | G06T 3/4038 348/48 |
| 2004/0246336 A1* | 12/2004 | Kelly, III | G06K 9/00771 348/143 |
| 2004/0257444 A1* | 12/2004 | Maruya | G08B 13/19645 348/169 |
| 2004/0258152 A1* | 12/2004 | Herz | G08B 13/19669 375/240.16 |
| 2007/0052858 A1* | 3/2007 | Zhou | G06K 9/00771 348/584 |
| 2008/0129825 A1* | 6/2008 | DeAngelis | A63B 24/0021 348/169 |
| 2008/0192116 A1* | 8/2008 | Tamir | G06T 7/292 348/157 |
| 2011/0128387 A1* | 6/2011 | Gans | H04N 7/181 348/169 |
| 2011/0164030 A1* | 7/2011 | Gay | G06T 19/00 345/419 |
| 2012/0188452 A1* | 7/2012 | Keiser | G06T 13/00 348/559 |
| 2012/0243730 A1* | 9/2012 | Outtagarts | G06K 9/00771 382/103 |
| 2012/0328153 A1* | 12/2012 | Yu | G06K 9/00771 382/103 |
| 2013/0148861 A1* | 6/2013 | Ferlatte | G06K 9/00624 382/107 |
| 2013/0218542 A1* | 8/2013 | Yerli | G06F 17/5009 703/6 |
| 2014/0037213 A1* | 2/2014 | Niederberger | G06T 11/00 382/195 |
| 2014/0050455 A1* | 2/2014 | Ni | H04N 9/8227 386/224 |
| 2015/0130799 A1* | 5/2015 | Holzer | G06F 16/532 345/420 |
| 2015/0170403 A1* | 6/2015 | Barcay | G06K 9/00476 345/427 |
| 2015/0172775 A1* | 6/2015 | Yee | H04N 21/485 725/37 |
| 2015/0249807 A1* | 9/2015 | Naylor | H04N 7/18 348/155 |
| 2016/0104510 A1* | 4/2016 | Tamir | H04N 5/222 386/223 |
| 2017/0148223 A1* | 5/2017 | Holzer | H04N 5/265 |

* cited by examiner

VIRTUAL FLYING CAMERA SYSTEM

The present application is a continuation-in-part application of U.S. patent application Ser. No. 14/875,330 filed on Oct. 5, 2015, which is herein incorporated by reference in its entirety.

FIELD

The field of this disclosure relates generally to camera systems, particularly to camera systems including multiple cameras.

BACKGROUND

Sports videography requires sophisticated camera operations. Since showing a right target subject in a desired angle is a key to successful sports videography, a typical sports videography system requires multiple cameras, and an individual camera operator for each camera shoots scenes of a sports game following a target subject. Typical multiple cameras used in a multi-camera system aim at and follow a moving target from their fixed locations. Some camera systems provide a sweeping view of a target at a moment of interest using the inputs from multiple cameras as if a single camera is rotating around the target and display a still image of the target in time.

Due to the physical constraints of a camera that is mounted on a static base, various limitations exist. For example, a single camera provides only a single viewpoint that has a specific field of view. Even multiple cameras may still miss an event or moment that may occur during a game play.

For fast track sports games such as auto racing, speed ice skating, field track, a stationary mounted camera poses challenges to follow a target subject in real-time during a live game. A flying camera mounted on a wire or a drone equipped with a camera can provide more interesting camera views and angles. For example, the flying camera can follow a fast-moving subject and show the subject in a consistent angle and distance highlighting exciting elements of the sports game such as an expression, motion, and action of a player, or a scene when the player passes another player during a game. A capability of following a target subject and providing scenes of interesting moments significantly increases a commercial value of a sports videography system, particularly in a sports game.

A flying camera has its own limitations. First, the flying camera poses a potential hazard and danger to players and spectators. Second, a shooting duration and a range of the flying camera are limited. For example, a wire for a flying camera cannot go beyond a straight section of a track and can cover only a portion of the entire track. Third and the most importantly, a flying camera provides a single viewpoint at a given camera speed and angle. The flying camera has to fly to a precisely right location at a right speed in order to capture a desired scene or action of a target subject. In addition, there is only one chance to fly the flying camera and shoot a scene. If the camera operator misses the chance, the obtained video stream may not include a desired scene or action of a target subject. The camera speed and angle of the flying camera is difficult to control, and is impossible to change after the camera shooting is completed. Furthermore, scenes that are more interesting may happen at an unintended location where the flying camera may not aim and cannot reach. For example, in an auto racing, cameras may be chasing the front lead and famous cars, but an accident can happen in an unexpected location of the racing track at an unexpected time. If there is no camera shooting at the unexpected location at the particular time during the auto racing, the scenes of the accident may not be properly obtained. Even scenes of the accident may be captured by some of the cameras, the camera angle of those cameras may not be ideal to capture the detailed actions of the accident.

SUMMARY

A virtual flying camera system is disclosed. According to one embodiment, a system includes: a video buffer configured store input video streams from a plurality of cameras; and a video processor configured to generate an output video stream from the input video streams. The input video streams include a plurality of input video frames, each of the plurality of input video frames includes at least a partial image of a moving target. The output video stream includes a plurality of output video frames, each of the plurality of output video frames is generated by shifting a corresponding input video stream to position the moving target at a desired location within the output video frame, The output video stream is playable at a user-adjustable speed showing a view of a virtually flying camera that follows the moving target at the desired location within each of the plurality of output video frames.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate presently preferred embodiment and together with the general description given above and the detailed description of the preferred embodiment given below serve to explain and teach the principles described herein.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A virtual flying camera system is disclosed. According to one embodiment, the virtual flying camera system includes a plurality of cameras disposed along a track and spaced apart from each other, a recording system configured to receive input video streams from the plurality of cameras, and a control system configured to generate an output video stream from the input video streams. The output video stream includes a view of a virtually flying camera following a target at a user-adjustable speed. The control system generates the output video stream by merging a plurality of portions of the input video streams from adjacent cameras of the plurality of cameras.

In the following description, for purposes of explanation only, specific nomenclature is set forth to provide a thorough understanding. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

The present disclosure provides a way to significantly improves the video shooting dynamic scenes in various environments, particularly a fast track sports such as auto racing, speed ice skating, and short track ice skating. The present camera system uses multiple stationary cameras and does not have to have moving parts or a track to physically move the cameras to follow a moving target object. The cameras having a low profile can be stationarily installed at a sports venue along a track without any moving parts.

The present camera system can generate a video stream following a moving target subject although none of the cameras physically may follow the moving target subject. The video stream is reconstructed or reproduced from the video streams taken with the plurality of cameras. The video stream includes a view of a virtually flying camera that appears to be moving or flying along with the moving target object. The position, angle, direction, and/or speed of the virtual flying camera are user-adjustable such that video streams having different position, angle, direction, and/or speed can be reconstructed or reproduced. The present camera system can also record all parts of a track during a game or an event. Thus, when an unexpected event of interest occurs, the present camera system can fully reconstruct the event and create a flying observation of the scene.

According to one embodiment, the present camera system receives video frames from multiple stationarily installed cameras and creates an output video stream displaying a moving target object within an output video frame, for example, at the center of the output video frame. The present camera system may not have any moving parts to follow the moving target object but is capable of creating a visual illusion to a viewer as if a camera is actually flying along with the moving target object. Herein, such a virtually flying camera is also referred to as a virtual flying camera.

According to one embodiment, a flying of the virtual flying camera is accomplished by two components including simulation of the flying in each camera video stream and merging of the video frames received from multiple adjacent cameras. The simulation and merging may occur concurrently or separately in any sequence. The simulation of the flying is mimicked by placing a target object at a desired portion (e.g., a center) of an output frame. Therefore, the simulation may require shifting, cutting, zooming, and/or stitching input frames that are taken concurrently or at different times (e.g., stitching a background image). In one embodiment, the simulation of the flying is accomplished by shifting the input video frames to the opposite direction of the target object's motion and placing the target object at the center (or anywhere at a desired location within the video frames) of the output video frame. In some embodiments, the simulation of the flying is accomplished by selecting a portion of the input video frames without shifting the input video frames. For example, the input video frames are obtained in a high resolution with a large field of view, and a desired portion of the input video frames are cut and zoomed in to obtain a portion of video frames for merging. When using high resolution cameras, the field of views of the adjacent cameras may overlap. The use of high-resolution cameras may reduce or eliminate a need for input video frame shifting to generate the output video frame. The merging of the frames from multiple adjacent cameras provides a seamless blending and interpolation of the video frames.

According to one embodiment, the present camera system provides a fully controllable camera speed. The camera speed of the virtual flying camera can be predetermined to be the same or different from the speed of the target object. In addition, the camera speed of the virtual flying camera can be adjusted to a desired speed by the simulation and merging processes. Since the present camera, system captures all the scenes of a venue during an event, therefore many different output video streams having different camera speeds. The amount of image shifting within a received video frame may vary depending on the speed of the target object and/or the speed of the virtual flying camera. In some embodiments, the speed of the virtual flying camera may be automatically determined based on the speed of the target object. For example, the present camera system determines the speed of the target object by the time stamps of each video frame of the cameras based on the known distance between the cameras. Once a target is identified, the present camera system can generate an output video frame placing the target at the center (or anywhere at a desired location within the video frames) as if the virtual flying camera flies along with the target object.

Based on the speed of the virtual flying, multiple video frames received by multiple cameras may be merged. The number of multiple video frames being merged and used to create an output video frame may vary depending on the user-defined speed of the virtual flying as well.

According to one embodiment, the present camera system provides multi-target tracking. Multiple targets can be processed at the same time using the multiple cameras without a need for multiple camera systems or multiple flying cameras flying on a wire.

According to one embodiment, the present camera system can provide both live and recorded virtual flying on live video stream as well as on the recorded material. The smoothness of the final output video stream may depend on the number of cameras in the field. As the video frames of adjacent cameras are merged, a small difference in the video frames may cause a discontinuing effect. If a sufficiently large number of the cameras is used, the discounting effect may be reduced or minimized. For example, in a 30 frame per second (fps) video, all 30 frames may be created from the video frames of different cameras.

For a fast moving object, a faster camera shutter speed minimizes a motion blur in the output video stream. According to one embodiment, an artificial motion blur may be added to create more natural visual effects. The artificial motion blur is easy to obtain from the virtual flying speed.

For a nonlinear motion such as a circular motion, the present camera system performs a different simulation of the virtual flying that follows a moving target. In this case, the present camera system may perform an additional image processing for simulation of an angle change besides the linear shifting of the video frames. For example, a resizing or an additional zooming in and out may be performed on the received video frames to place the target at a desired portion of the output video stream at a desired scale (i.e., zooming in or out) and a desired direction and angle.

According to one embodiment, the present camera system may perform the capturing of the video frames in a higher resolution than the final output video resolution. In this case, the merging of the video frames could be more effective by utilizing out-of-frame video sections.

According to one embodiment, the present camera system performs an image processing to separate the moving target and a static background image from the received video frames. The final video output may include the background image that is taken at a different time. The background image may be merged with the target object with an independent image processing.

Figure 1:
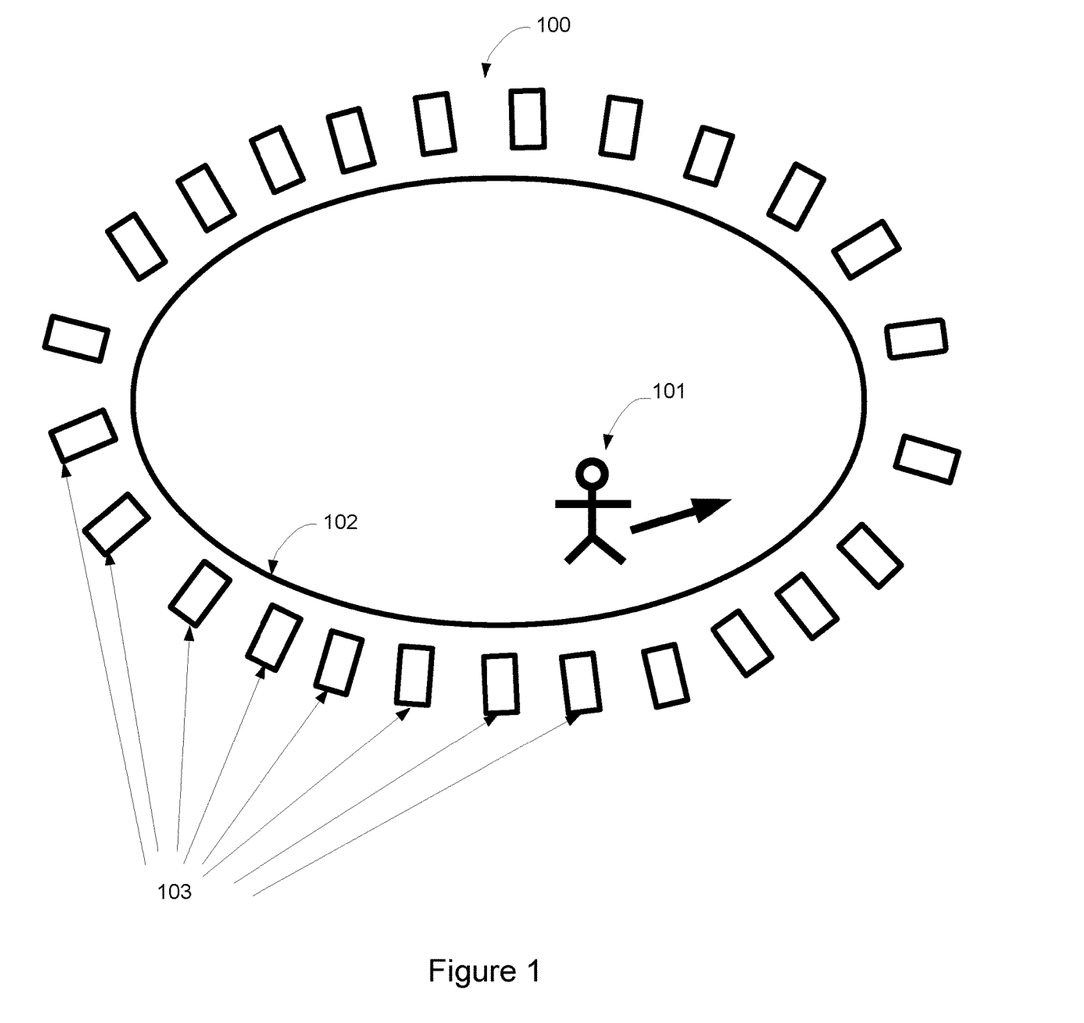
FIG. 1 illustrates an exemplary virtual flying camera system, according to one embodiment.

FIG. 1 illustrates an exemplary virtual flying camera system, according to one embodiment. The virtual flying camera system can be set up at various venues such as an auto racing track, a field track, speed ice skating track, and a short track ice skating track. However, it is understood that the present camera system can be used for other applications including, but not limited to, movie and video game production.

The virtual flying camera system 100 includes a plurality of cameras 103 that are placed along a track 102 of a sports venue. Each of the cameras 103 can take shots of a designated area of the track to cover the entire area of the track 102 at any given time.

The track 102 could be a sports stadium, an ice link, an auto-racing track, a horseracing track, a dog racing track, or any location that a videography shooting occurs. Other examples of the track 102 include, but are not limited to, a football, soccer, baseball, hockey, or ice hockey stadium, and a basketball and volleyball court.

It is noted that any number of cameras 103 may be placed at designated locations such as inside the track 102, on ceiling of the track 102, or on a moving platform that may move before, after or during a game. The cameras 103 are spaced apart by a predetermined distance or a varying distance depending on the location of the camera 103. For example, more cameras 103 are placed near or at a finish line of the track, thus the spatial gap between the cameras 103 near the finish line is narrower than that of the cameras 130 that are disposed away from the finish line. The narrower spatial gap between the cameras 103 can produce videos of a higher spatial resolution and smooth motion.

At any given point in time during a game, a subset of the cameras 103 follow a moving target 101 while other cameras 103 take shots of their own designated areas of the track. For example, the target 101 is a runner, a skater, a racing car, a horse, an airplane, a drone or any other moving person or object. In some embodiments, the target 101 may be a moving reference that may not be associated with a physical object or person. For the purpose of illustration, the target 101 is shown to be moving in the counter clockwise direction as shown in FIG. 1. In other non-track sports games such as football, soccer, baseball, hockey, and basketball, the moving target 101 may be moving randomly inside the track 102. Even in a non-track sports game, multiple cameras 103 capture videos of a moving target 101 because the cameras 103 cover the entire playing field or court of a sports game. The target 101 could be a single subject or any number or group of subjects that may be moving at various different speeds along the track 102.

There is no limit for the number of the cameras 103. For example, several hundred to several thousand of the cameras 103 may be used to cover the entire track 102 and provide a smooth, clear, and stable video images of a game at a desired camera angle and speed. In one embodiment, the cameras 103 face perpendicular to the track so that the camera angle is perpendicular to a direction of motion of the players of a game including the target 101. In this arrangement, the cameras 103 have a constant distance from the perimeter of the track 102, thus providing a constant field of view.

Each of the cameras 103 may have a zoom lens so that the captured scene has a right amount of field of view regardless of the physical location of the camera 103. The distance between the cameras 103 may be determined based on the zoom lens and the field of view of each of the cameras. The adjacent cameras 103 must have an overlapping portion of the track such that a moving target 101 can be captured by multiple cameras 103 at any given time. The cameras 103 may have a faster shutter speed to minimize a motion blur effect and provide a smooth and seamless playback video. The camera 103 could be mounted along a track or along the seating areas for the spectators. Depending on the distance from the track, the camera 103 may be equipped with a proper optical lens.

Figure 2:
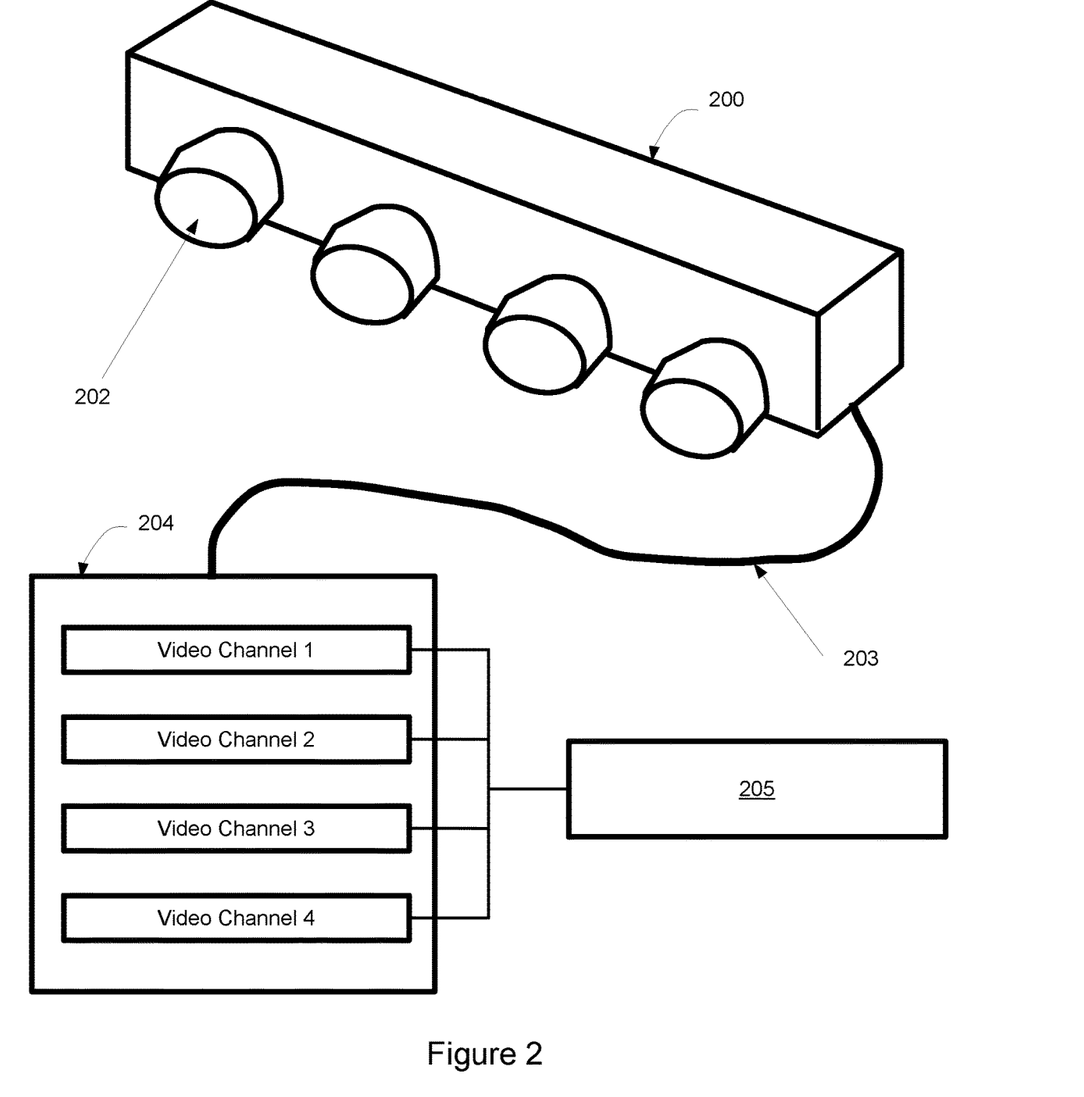
FIG. 2 shows a schematic diagram of an exemplary camera system, according to one embodiment.

FIG. 2 shows a schematic diagram of an exemplary camera system, according to one embodiment. A camera system includes at least one camera module 200. The camera module 200 includes one or more cameras 202 encased in a housing 201. Although four cameras 202 are shown in FIG. 2, it is understood that any number of cameras 202 may be incorporated in the camera module 200. Based on the total number of cameras 202 to be deployed, the camera system may include a plurality of camera modules 200. The camera modules 200 may be fixedly connected to each other or spaced apart from each other. The gap between the adjacent camera modules 200 may be set in such a way that the all cameras 202 of the camera system are spaced apart with a predetermined constant gap. According to one embodiment, the gap between the cameras 202 in the camera module 200 may be changed on the fly by various mechanisms that removably fix the cameras 202 to the camera module 200. The camera module 200 including multiple cameras 202 is a unit of a building block to build a camera system, for example, the virtual flying camera system 100 shown in FIG. 1.

Each camera 202 is mounted at a known position and angle with respect to the housing 201 of the camera module 200. The gap between the cameras 202 may be set to be uniform across the camera module 200, but it is understood that the gap can vary, for example, using a sliding mechanism, within the camera module 200. The camera module 200 outputs data in various formats including, but not limited to, a standard digital video format such as high-definition multimedia interface (HDMI) and serial data interface (SDI), and a video encoding format such as H.264 or H.265.

The camera module 200 is connected to a recording system 204 via a cable 203. The cable 203 may be a network cable (e.g., Ethernet cable) or a video/audio signal cable (e.g., RCA, composite, HDMI). In one embodiment, the recording system 204 is a video recording system such as a digital video recorder (DVR). The recording system 204 includes a data interface (not shown) to receive video data signals from the camera module 200 and a storage (not shown) for storing the raw and/or compressed video data received from the camera module 200. The recording system 204 may further store a video data that is processed from the received raw or compressed video data. The uncompressed video data over the HDMI or SDI interface may be stored as compressed in the recording system 204 to reduce the data size. The video data of multiple channels may be transferred from the camera module 200 to the recording system 204 over the cable 203 as encoded and/or compressed. If the video data that is already encoded and compressed is received, a standard data network interface such as gigabit network interface may be used as the data interface of the recording system 204.

The storage of the recording system 204 is used to save video streams from one or more camera modules. For example, input video streams from the camera module 200 include 16 channels or 32 channels of high-definition (HD) video data. As the data processing speed and performance, the network speed, and/or the storage size increase, more video channels may be saved in the storage of the recording system 204 at the same time. The size and speed of the storage may determine the number of video channels that can be concurrently received by the recording system 204 as well as the number of cameras 202 incorporated in a single camera module 200.

A control system 205 is connected to the recording system 204. The control system 205 receives a video stream from the recording system 204 and provides an interaction to the user. The video stream might be a recorded video stream from the recording system 204 or a live feed from the cameras 202. The live feed from the cameras 202 might be encoded and/or compressed in the storage of the recording system 204. The storage of the recording system 204 may have a memory buffer that can write and transfer data faster between the recording system 204 and the control system 205. The control system 205 processes the input video stream from the recording system 204 and generates a video output that will be delivered to a producer or directly to a viewer. The video output may be generated based on various control inputs from a user such as the target location, the start time, the end time, and the speed, and the angle, or the like. The video output is obtained in a mix-down process that will be explained in further detail below. The mix down-stream allows a user to view any part of the track as if a single camera is flying through the track. The speed and angle of the virtually flying camera may be changed base on the control inputs. In some embodiments, the video output may be automatically generated with a minimal or no control input from the user.

According to one embodiment, multiple recording systems 204 may be connected to the control system 205. Each recording system 204 is connected to a corresponding number of camera modules 200. The camera system covers the entire venue and the control system simultaneously records the video streams from the cameras of one or more camera modules 200. If each video recording system can concurrently handle 32 channels, and 320 cameras are installed at the venue, 10 video recording systems are necessary for the camera system.

Figure 3:
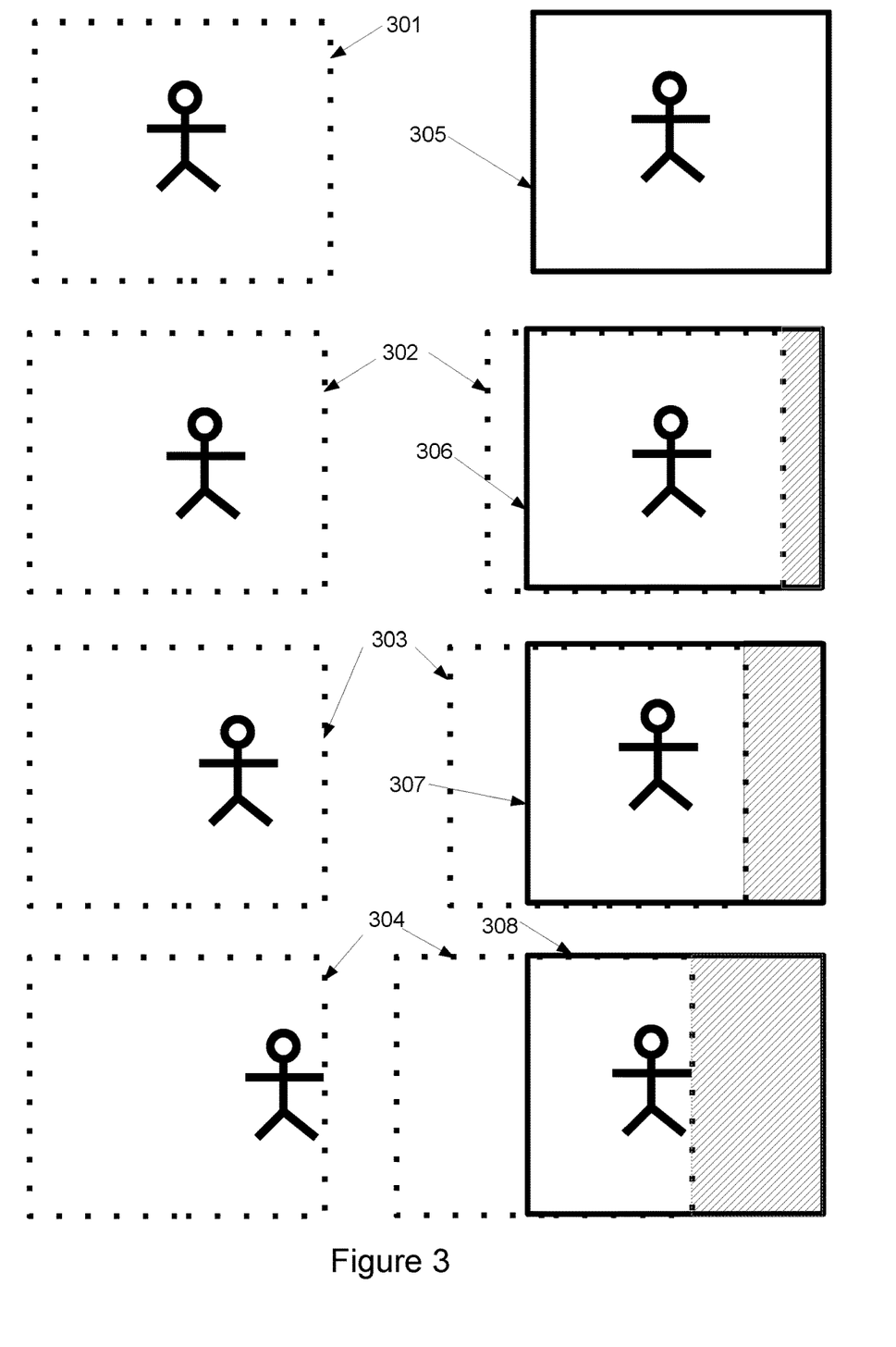
FIG. 3 explains an exemplary camera processing in a single stream, according to one embodiment.

FIG. 3 explains an exemplary camera processing in a single stream, according to one embodiment. An input video stream received from a camera includes video frames 301, 302, 303, and 304. Thus, each frame represents a time progress on the particular camera. As the target 300 moves to the right in the video stream, the image of the target 300 appears more toward the right side of the frame. The control system receives this video stream and generates an output video stream including the video frames 305, 306, 307, and 308. The output video stream is herein also referred to as a virtual flying camera shot because the output video stream appears to be a camera shot taken from a flying camera although no flying camera is used. Although four video frames are used in this example, it is understood that any number of video streams may be used to generate an output video stream from multiple cameras.

As a user defines the speed and angle of the virtual flying camera, the output video frame is shifted from the input stream to show the target 300 at a fixed location, in this case, at the center, within the output video stream. As shown in FIG. 3, the dotted line in the video frames 306, 307, and 308 represents the input video stream, and the solid line represents the output video stream.

If the speed of the virtual flying camera is identical to the target speed, the target 300 appears at the center of the output video stream. The shaded area for the video frames 306, 307, and 308 of the output video stream that is not shown in the input video stream is filled by an image from a next camera stream or a pre-recorded background video stream. For example, the background image of a track is pre-recorded and processed to associate with a particular camera. Each camera is associated with a portion of the background image of the track with a known field of view. The input video stream may overlap with the pre-recorded background image of the track to fill the shaded area that is missing from the input video stream at a particular video frame from a particular camera.

If the speed of the virtual flying camera is different from the target speed, an output video stream is generated to reflect the difference in the speeds. In one embodiment, the speed of the virtual flying camera may be doubled by shrinking the time scale in half using the same video frames 305-308. In another embodiment, the video frames may be skipped to speed up the virtual flying camera without changing the time scale of the output video stream. In one example, every other video frames (e.g., 305, 307 and so) may be used while keeping the same time scale of the input video stream. Conversely, the speed of the virtual flying camera can be slowed down by interpolating input video streams from multiple channels and generating more video frames than the input video streams or slowing down the time scale of the output video stream.

Figure 4:
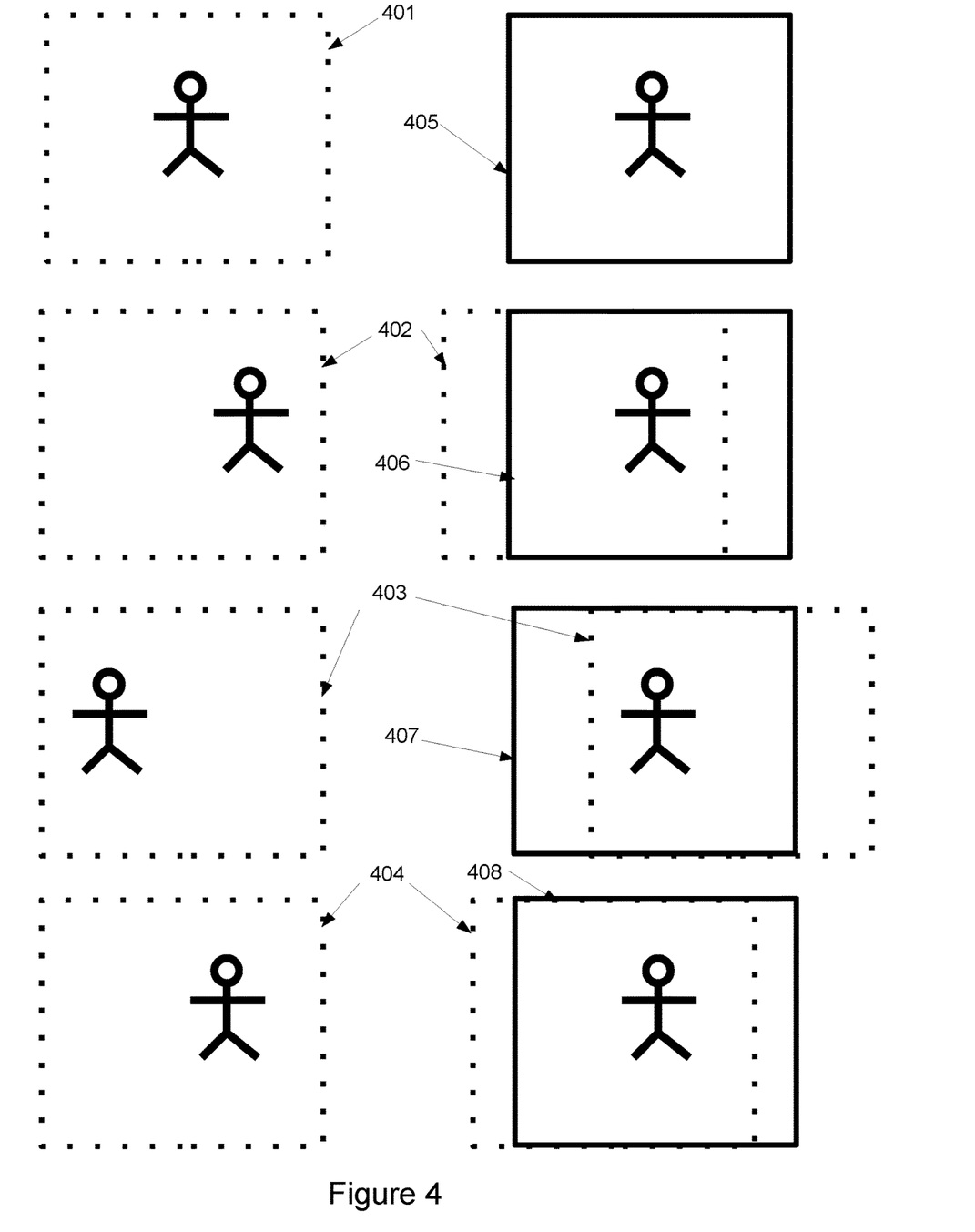
FIG. 4 shows an exemplary process for switching a video channel in an output video stream, according to one embodiment.

FIG. 4 shows an exemplary process for switching a video channel in an output video stream, according to one embodiment. Consecutive video frames 401 and 402 are received from of the camera 1. As the target 400 moves, the target 400 appears toward the right side in video frame 402. The video frame 403 is the next video frame on the camera 2 that is installed next to the camera 1. Since the camera 2 is installed on the right side of the camera 1, the target 400 may still appear at the left side of the video frame 403. The video frames 405, 406, 407, and 408 represent an output stream generated from the input video frames 401, 402, 403, and 404. The video frame 406 shows a shifting from the input stream 402 based on the virtual flying speed. The video frame 407 is the next frame that follows the video frame 406, but the input video stream for generating the video frame 308 is switched from the camera 1 to the camera 2. Therefore, the input video frame 403 is shifted to the right side to compensate the difference of the camera position. The video frame 408 is generated from the input video frame 404 of the camera 2 and shows a continuous motion of the target 400. The same process may repeat to follow the target from multiple cameras. The virtually flying camera, therefore, can follow a certain target as if a flying camera follows the target.

As the target makes a continuous move, either the camera system shifts the input video streams and switches to the next stream continuously. This camera shifting process makes it possible to place the target at the center of the output video stream. The camera system provides views an action of the target at a consistent angle, and the viewers perceive that the camera is flying along with the target.

Since all the cameras are continuously streaming, the viewpoint could be changed instantly to any part of the track. The flying speed can change to any speed by adjusting the time scale of the output video stream or skipping or interpolating multiple input video streams as explained above. Therefore, the virtually flying camera can track any target and multiple targets any time during a game play with an angle and speed that is controllable by a user or the camera system. The present camera system allows a broadcaster to select the right target as the sports game is progressing. Furthermore, the present camera system can simultaneously track multiple targets without deploying multiple flying cameras. The targets may be selected during the processing to reconstruct any target or even any part of the track without being limited to physically moving cameras that may not be able to cover the entire track. Since all the streams are concurrently recorded to the recording system, the present camera system can reconstruct any missing event or moment from the recorded data.

The present camera system includes multiple camera modules and multiple cameras stationarily mounted on, along, or around a venue. The present camera system does not require any moving part. The video recording system that captures the video stream from the multiple cameras. The control system that connects to the digital video recording system. A mix-down of the input video frames may occur to shift the input streams and provide smooth and seamless output video stream based on the virtual flying speed.

According to one embodiment, the present camera system runs a calibration procedure to calibrate the multiple cameras before (or after) a camera shooting. The calibration procedure provides a fine adjustment of the camera angles, brightness, colors, contrasts, field of views, etc. of input video frames to be obtained by the multiple cameras. The calibration is particularly useful for predetermining an amount of video frame shifting when merging two or more input video frames that are obtained from adjacent cameras. After the calibration procedure, the control system stores the calibration data and uses the calibration data to reconstruct a virtual flying using input video frames that are fed in real time or pseudo real time during an event or a game.

The calibration of the present camera system may be performed when a track is empty, and there are no moving target. In some embodiments, the calibration is performed by shooting a moving calibration object (e.g., a player in a practice run, a dummy cart, a lure on a track) along the track so that each of the cameras takes a shot of the calibration object at least once. In one embodiment, the moving calibration object has geometric and color patterns that are clearly visible and discernable to the cameras. Comparing the location of geometric pattern of the moving calibration object, the control system makes fine adjustment of the frame position of each channel. Comparing the colors of the moving calibration object, the control system makes the fine color and lighting adjustment of each channel. The calibration process ensures the seamless transition between channels so that a viewer can experience smooth and continuous camera motion.

The control system analyzes the video frames taken by each camera and samples portions of the video frames including the moving calibration object. The sampled video frames including the moving calibration object are used to reconstruct an output video frame that is virtually flying with the moving calibration object. The variations in color, light condition, camera angle, field of views, etc. among adjacent camera frames are adjusted to provide a smooth and stable output video frame. The fine adjustment of the color, light condition, camera angle, field of views, etc. may be performed manually and/or automatically.

During the calibration procedure of the present camera system, the multiple cameras generate video frames and send them to the control system. The background image of the track may be obtained during the calibration procedure, which is used for filling in shifted or partially cut input video frames when merging input video frames from adjacent cameras.

For an outdoor track, the calibration may be performed several times at different times of a day or different weather conditions so that the background image of the track that is obtained during the calibration can represent the best-fitted background image of a game depending on the time and weather condition.

The cameras have a high shutter speed to capture a fast moving object. The distance from the camera to a target may be pre-defined. The camera module has a mounting mechanism for multiple cameras to allow a fine adjustment of the position and angle. The camera module is connected to the recording system via a network cable or a multimedia cable. Although the present camera system may include stationarily mounted cameras, the cameras or the camera modules including one or more cameras of the present camera system may include a moving part to better track a dynamically moving target. The cameras of such a tracking camera system identify a movement of a target and follow the target as the target moves. The cameras of the present camera system may follow a particular target using a rotational and/or translational motor attached to the camera module 200 shown in FIG. 2. The target may be identified by an ID or an identifier attached to the target (e.g., a number of player). In some embodiments, a target that is initially identified may be continuously followed in the output video frame.

Figure 5:
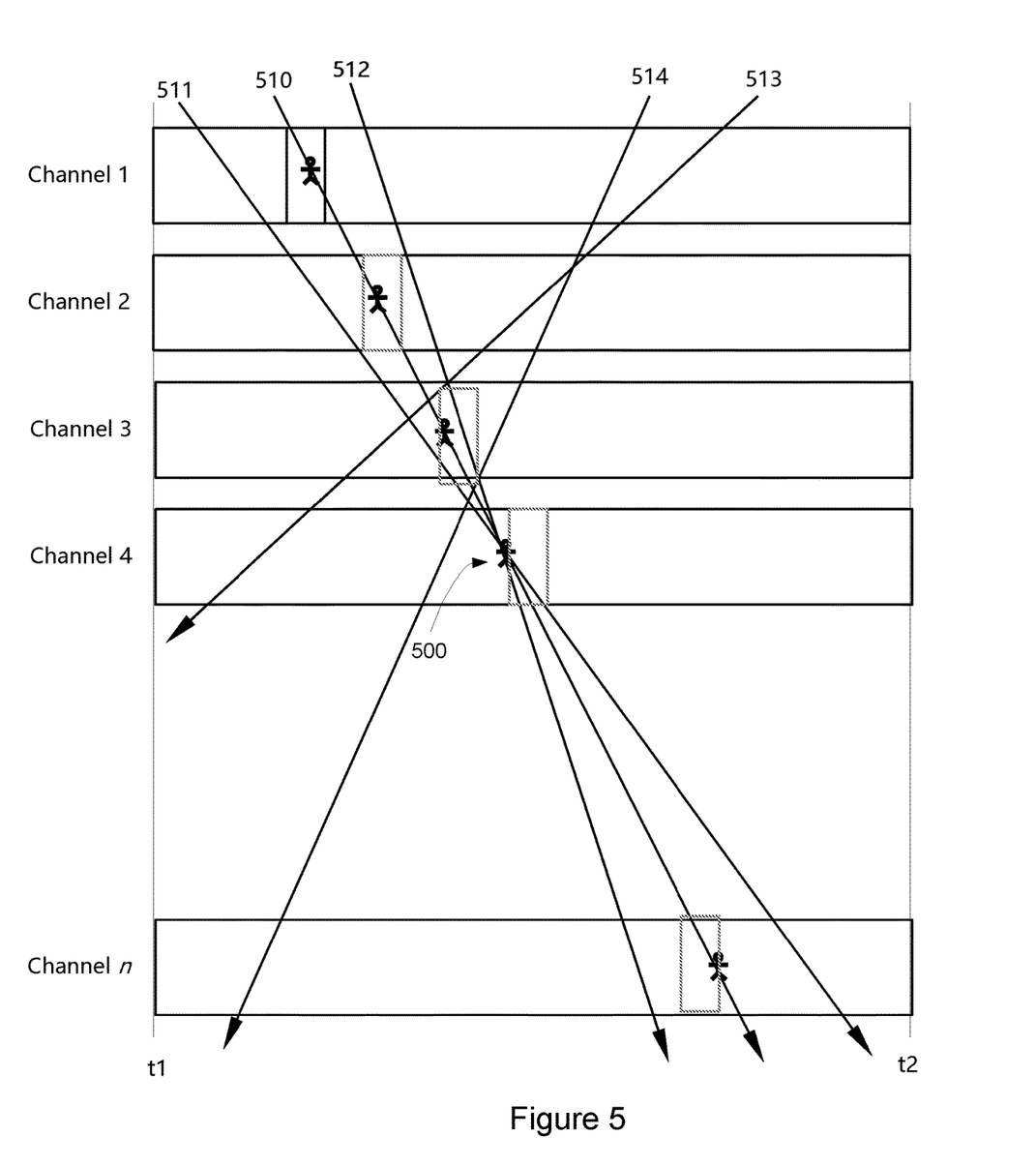
FIG. 5 shows an exemplary process for generating an output video stream with a varying speed and angle, according to one embodiment.

FIG. 5 shows an exemplary process for generating an output video stream with a varying speed and angle, according to one embodiment. Using the multiple cameras installed in a track, the present camera system can cover the entire track from the beginning of a game to the end of the game without missing a moment or event that occurs during the game. The output video stream of a virtual flying camera is generated based on control inputs from a user including, but not limited to, a video angle and speed.

Video frames 500 includes n video channels received from n cameras. Each video channel has video frames 1-$m$, and each of the video frames was taken from at a time between t1 to t2. A target 500 moves within the video frames from the n video channels as indicated by an arrow 510. A first output video stream is generated by following the target 500 as explained with reference to FIGS. 3 and 4. Since the output video stream is reconstructed by the input video stream by merging and switching video frames from the n video channels without adjusting the time scale of the input video stream, the speed of the virtually flying camera is the same as the speed of the moving target 500.

According to one embodiment, the speed of the virtually flying camera can be changed by shifting the video frames at a speed different from the speed of the target 500. The arrow 511 indicates the video frames that are used to generate a faster flying camera that sweeps the track faster than the speed of the target 500. Such a video output stream may include a panning or a sweeping shot of a target to show the dynamics of the target covering from the rear view to the front view within the output video stream. This may provide a dramatized view of the target that is more visually appealing.

According to one embodiment, the speed of the virtually flying camera is deliberately slowed down to show a video from a leading player to following players. The arrow 512 indicates the video frames that are used to generate a slowly flying camera that that sweeps the track slower than the speed of the target 500. Similarly, the arrows 513 and 514 indicate the video frames that are used to generate a flying camera that may fly in a reverse direction at different speeds.

The present camera system includes cameras that are installed along a track. In this case, the output video stream may have only two camera angles, forward or backward. According to one embodiment, the cameras may be installed in a three-dimensional fashion such that an output video stream from a virtually flying camera that flies in a three-dimensional (3D) space can be generated. In this case, a diverse camera angle may be achieved. Due to the simplicity of players' action that may occur during a game play, a two-dimensional (2D) camera system as shown in FIG. 1 may be sufficient to cover a track sports such as an ice speed skating, a short track speed skating, etc.

According to one embodiment, the present camera system can calculate a 3D depth map (herein also referred to as a 3D map) on each video stream frame. Since the present system uses multiple input video frames overlapping at least a portion with each other, the present camera system can construct the 3D depth map. In one embodiment, the present camera system employs a computer vision algorithm to construct the 3D depth map. According to one embodiment, the 3D depth map represents a distance of objects in the input video streams from each of the cameras.

As the virtual flying camera moves, the video frame from a camera virtually shifts to the next video frame. In the process of the moving, a video frame is gradually interpolated with the next video frame. In the process of the interpolation, the 3D depth map can make the shifting of the video frames and the transition between cameras more accurate and smooth. Since an object that is closer to the camera moves faster than an object that is farther away from the camera, the interpolation using the 3D depth map can shift a specific target object based on the depth (distance) of the target object from the camera. This results in more smooth transition from one video frame to the next video frame.

According to one embodiments, the 3D depth map can provide a distance and a speed of a plurality of moving targets. For example, in a 100 m sprint event, a relative position of runners is the most critical visual information. Each runner has a depth (distance) from the cameras, and the shift speed to the next frame is slightly different from other runners. The present 3D depth map-based interpolation can make the shifting of the output video frames more accurate and reduce jittering of the runners in the output video frame. As a result, the present camera system can deliver critical visual information more accurately and seamlessly.

According to one embodiment, the present camera system can determine an amount of shifts for a selected moving target in each of the output video frames using the reconstructed 3D depth map. Using the 3D depth map, the present camera system can place the selected moving target at a specific position and a distance from the virtual flying camera.

According to one embodiment, multiple cameras may be placed at known locations along a predetermined path or track. At each predetermined location, one or more cameras may be installed to facilitate calculation of the 3D depth map. The present system may simultaneously process input video frames from the multiple cameras to calculate the 3D depth map for one or more target objects. The 3D depth map may calculate depth information (i.e., a distance) of objects from each of the cameras, the location of which is already known, in the input video streams.

An object that is located closer to a camera than a moving target shifts more than the moving target in adjacent input video frames due to the difference in the distances from the camera. Similarly, an object that is located farther from a camera than the moving target shifts less than the moving target in the adjacent input video frames.

One or more objects appearing in the input video streams may be used as a reference object for calculating the 3D depth map. Those reference objects may be stationary objects that have a predetermined distance from the cameras. By calculating an amount of shifts of a target object in the input video frames with respect to the amount of shifts of the reference object, the 3D depth information of the target object can be calculated. By processing the 3D depth information of the target object in consecutive input frames, the present camera system can also calculate the speed of the target object.

According to one embodiments, the 3D depth map can provide a distance and a speed of a plurality of moving targets. Since the amount of shifts of reference objects in an input video stream is known a priori based on the predetermined distances from the cameras, the present camera system can reconstruct an output video frame including at least one selected moving target among the plurality of moving targets. The selected target object may appear at a predetermined position within the output video frames using the shifting and stitching techniques discussed above. The predetermined position of the selected moving target may be the center of the output video stream as described in the example of FIGS. 3 and 4.

Figure 6:
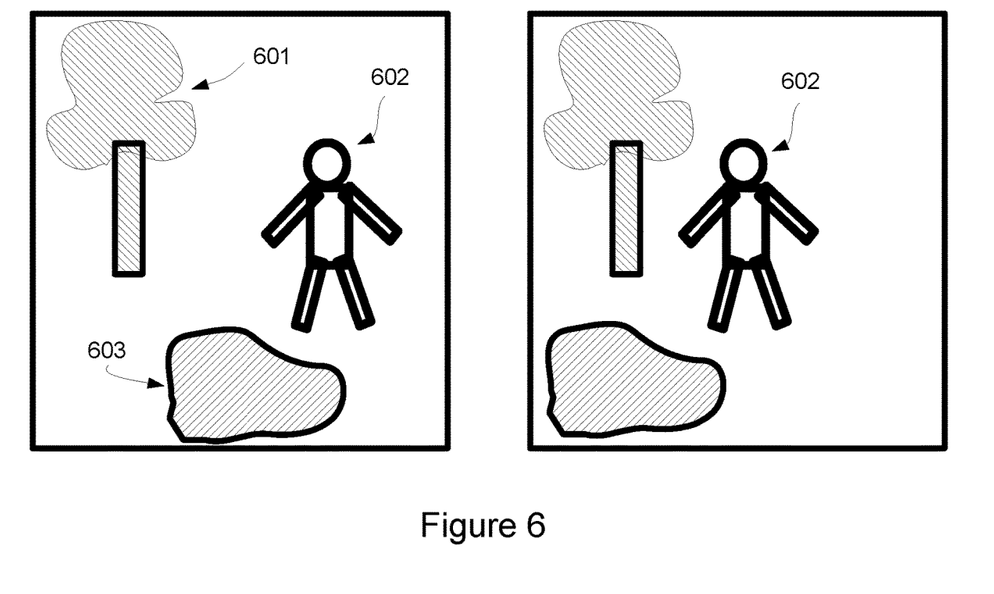
FIG. 6 shows shifting of objects in consecutive video frames depending on a 3D depth from a camera, according to one embodiment.

FIG. 6 shows shifting of objects in consecutive video frames depending on a 3D depth from a camera, according to one embodiment. An object 603 that is relatively closer from a camera than an object 601 shifts more than in consecutive video frames. An amount of shift of a stationary target that has a distance from the camera between the objects 601 and 603 can be calculated by the 3D depth map that is generated and constantly updated using multiple input video frames that include at least a portion of one or more of the objects 601, 602, and 603 taken by the multiple cameras. If the target 602 moves, the present camera system can calculate a speed and a change of distances from each of the cameras based on the 3D depth map.

According to one embodiment, the present camera system can determine the amount of shifts for the selected moving target in each of the output video frames using the reconstructed 3D depth map. Using the 3D depth map, the present camera system can place the selected moving target at a specific position and distance from the virtual flying camera.

Using the 3D depth map, the present camera system can generate an output video stream in which the selected moving target among the plurality of moving targets appears at the center of the output video stream as if the virtual flying camera follows the selected moving target at the substantially same speed. At the same time, using the same input video streams, the present camera system can generate another output video stream of a different moving target (second moving target) among the plurality of moving targets by adjusting the amount of shifts in the input video streams and placing the second moving target at the center of the output video stream. Because the present camera system can provide output video streams of multiple moving targets using the same input video streams, the present camera system can provide output video streams of multiple flying cameras following multiple moving target objects using the same input video streams.

In one embodiment, the present camera system can place the target object in the output video stream along a user-specifiable flying path instead of placing at a predetermined location (e.g., center) within the output vide frame by varying the relative distance of the target object from the virtual flying camera. For example, the virtual flying camera may approach a selected moving target closer or farther by adjusting the amount of shifts within the input video streams and/or zooming in and out of the input video streams within the 3D depth map. In doing so, the present camera system can also arbitrarily change the speed and/or camera angle of the virtual flying camera with respect to the moving target. For example, the virtual flying camera may provide a spanning shot of a moving target in which the virtual flying camera passes over the moving target instead of following the target at the same speed. In another embodiment, the virtual flying camera can fly along a predetermined path within the 3D depth map showing the target object in different angles in each of the output video streams.

Figure 7:
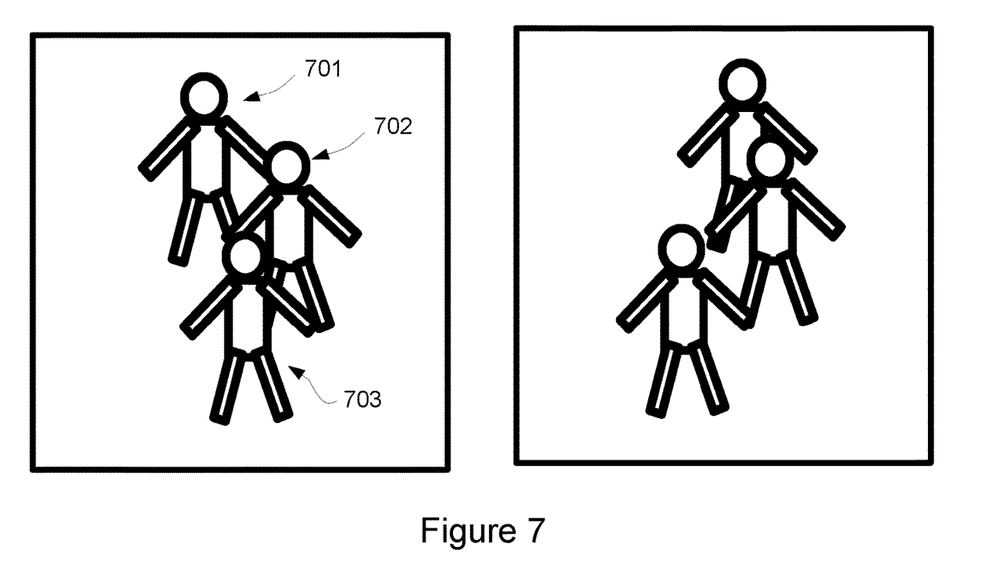
FIG. 7 shows an exemplary process of generating an output video frame of a plurality of targets with a 3D depth map, according to one embodiment.

FIG. 7 shows an exemplary process of generating an output video frame of a plurality of targets with a 3D depth map, according to one embodiment. Target objects 701, 702, and 703 may move at different speeds. When determining an amount of shifts from one output video frame to the next output video frame, a depth information of a selected target can be used to provide more smooth and seamless transition. In the present example, the targets 701, 702, and 703 are relatively closer to each other, for example, players in a sport event. The present 3D depth map-based camera system can provide more accurate video frame shifting compared to two-dimensional image-based camera system.

The present camera system is used for broadcasting a sport event, for example, a short track skating event. Multiple skaters skate along a track, and the present camera system captures video streams using a plurality of cameras positioned along the track. The present camera system can generate an output video stream of a skater using the image shifting and stitching techniques based on a 3D depth map. In the output stream, the virtual flying camera can flying along a path within a 3D space to shows specific details of an incident that occurs during the event. For example, the present camera system can reconstruct the incident at the view of a virtual flying camera that is user-specifiable in terms of the flying path, speed, distance, and camera angles. A referee can refer to the reconstructed view of the incident to determine a penalty or disqualification of a skater. A conventional camera system can only show static images from multiple cameras at fixed angles. However, the present camera system can provide different views and user experience constructing and showing a view of multiple virtual flying cameras at a user-selectable path, distance, speed, and camera angle without requiring physical flying cameras.

According to one embodiment, the processing of input video streams can be implemented in a software, hardware (e.g., graphics processing unit (GPU), a hardware accelerator), or a combination of both. In this case, the present camera system may be defined not to include physical cameras, but merely include a recording system (e.g., an image buffer) and a video stream processing module. In this case, the camera system is configured to receive input video streams, process the input video streams, and optionally user inputs or user-specifiable parameters (e.g., selection of a moving target, a flying path, speed, distance, and angle of a virtual flying camera with respect to the moving target), and generate an output video stream corresponding to a user-selectable parameters of the virtual flying camera.

A virtual flying camera system has been disclosed. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

I claim:

1. A system comprising:
 a video buffer configured to store input video streams from a plurality of cameras; and
 a video processor configured to generate an output video stream from the input video streams,
 wherein the input video streams comprise a plurality of input video frames, each of the plurality of input video frames includes at least a partial image of a moving target that moves in a three-dimensional (3D) space at a target speed,
 wherein the output video stream comprises a plurality of output video frames, each of the plurality of output video frames is generated by shifting a corresponding input video stream to position the moving target at a desired location within the output video frame,
 wherein the output video stream is playable at a user-adjustable playing speed showing a viewpoint of a virtually flying camera that follows the moving target within the 3D space along a user-specifiable camera path at a user-specifiable flying speed by positioning the moving target at the desired location within each of the plurality of output video frames, and
 wherein the desired location of the moving target within each of the plurality of output video frames is dynamically variable according to a difference between the target speed of the moving target and the user-specifiable flying speed of a virtual flying camera,
 wherein at least some of the plurality of input video frames include a reference object that has a known distance from the plurality of cameras, and wherein the video processor constructs a three-dimensional (3D) map including distance information of the moving target and the reference object from each of the plurality of cameras, and
 wherein the video processor further determines a change of a distance of the moving target from each of the plurality of cameras and the target speed of the moving target based on an amount of shifts of the reference object in the plurality of input video frames.

2. The system of claim 1, wherein the output video stream shows the viewpoint of the virtual flying camera that flies along the user-specifiable camera path at the user-specifiable flying speed, and at a camera angle that is also user-specifiable.

3. The system of claim 1, wherein the video processor zooms in and out the input video streams to change a distance of the virtual flying camera from the moving target.

4. The system of claim 1, wherein the video processor is configured to generate a plurality of output video streams showing a plurality of views of one or more virtually flying cameras that follow the moving target at a camera distance and a camera angle that are user-specifiable.

5. The system of claim 1, wherein the system is implemented in a software, a hardware, or a combination of the software and the hardware.

6. The system of claim 1, wherein the system is used for broadcasting a sport event.

7. The system of claim 1, wherein the video processor is configured to reconstruct one or more views of a plurality of virtual flying cameras using the same input video streams.

8. A system comprising:
 a video buffer configured to store input video streams from a plurality of cameras; and
 a video processor configured to generate an output video stream from the input video streams,
 wherein the input video streams comprise a plurality of input video frames, each of the plurality of input video frames includes at least a partial image of a moving target that moves in a three-dimensional (3D) space at a target speed,
 wherein the output video stream comprises a plurality of output video frames, each of the plurality of output video frames is generated by shifting a corresponding input video stream to position the moving target at a desired location within the output video frame,
 wherein the output video stream is playable at a user-adjustable playing speed showing a viewpoint of a virtually flying camera that follows the moving target within the 3D space along a user-specifiable camera path at a user-specifiable flying speed by positioning the moving target at the desired location within each of the plurality of output video frames, and
 wherein the desired location of the moving target within each of the plurality of output video frames is dynamically variable according to a difference between the target speed of the moving target and the user-specifiable flying speed of a virtual flying camera,
 wherein at least some of the plurality of input video frames include a reference object that has a known distance from the plurality of cameras, and wherein the video processor constructs a three-dimensional (3D) map including distance information of the moving target and the reference object from each of the plurality of cameras, and
 wherein the video processor determines an amount of shifting to position the moving target at the desired location within the output video frame using the distance information of the moving target based on the 3D map.

9. A method comprising:

receiving and storing input video streams from a plurality of cameras, wherein the input video streams comprise a plurality of input video frames, each of the plurality of input video frames includes at least a partial image of a moving target that moves in a three-dimensional (3D) space at a target speed; and generating an output video stream including a plurality of output video frames from the input video streams, wherein each of the plurality of output video frames is generated by shifting a corresponding input video stream to position the moving target at a desired location within the output video frame, wherein the output video stream shows a viewpoint of a virtually flying camera that follows the moving target within the 3D space along a user-specifiable camera path at a user-specifiable flying speed by positioning the moving target at the desired location within the output video frame, and wherein the desired location of the moving target within the output video frame is dynamically variable according to a difference between the target speed of the moving target and the user-specifiable flying speed of a virtual flying camera, wherein at least some of the plurality of input video frames include a reference object that has a known distance from the plurality of cameras, and wherein the method further comprising:

constructing a three-dimensional (3D) map including distance information of the moving target and the reference object from each of the plurality of cameras, and determining a change of a distance of the moving target from each of the plurality of cameras and the target speed of the moving target based on an amount of shifts of the reference object in the plurality of input video frames.

10. The method of claim 9, further comprising playing the output video stream at a user-adjustable playing speed.

11. The method of claim 9, further comprising determining an amount of shifting to position the moving target at the desired location within the output video frame using the distance information of the moving target based on the 3D map.

12. The method of claim 9, further comprising showing the viewpoint of the virtual flying camera that flies along the user-specifiable camera path at the user-specifiable flying speed, and at a camera angle that is also user-specifiable.

13. The method of claim 9, further comprising zooming in and out the input video streams to change a distance of the virtual flying camera from the moving target.

14. The method of claim 9, further comprising generating a plurality of output video streams showing a plurality of views of one or more virtually flying cameras that follow the moving target at a camera distance and a camera angle that are user-specifiable.

15. The method of claim 9, further comprising broadcasting a sport event including the moving target.

16. The method of claim 9, further comprising reconstructing one or more views of a plurality of virtual flying cameras using the same input video streams.

* * * * *